UNITED STATES PATENT OFFICE.

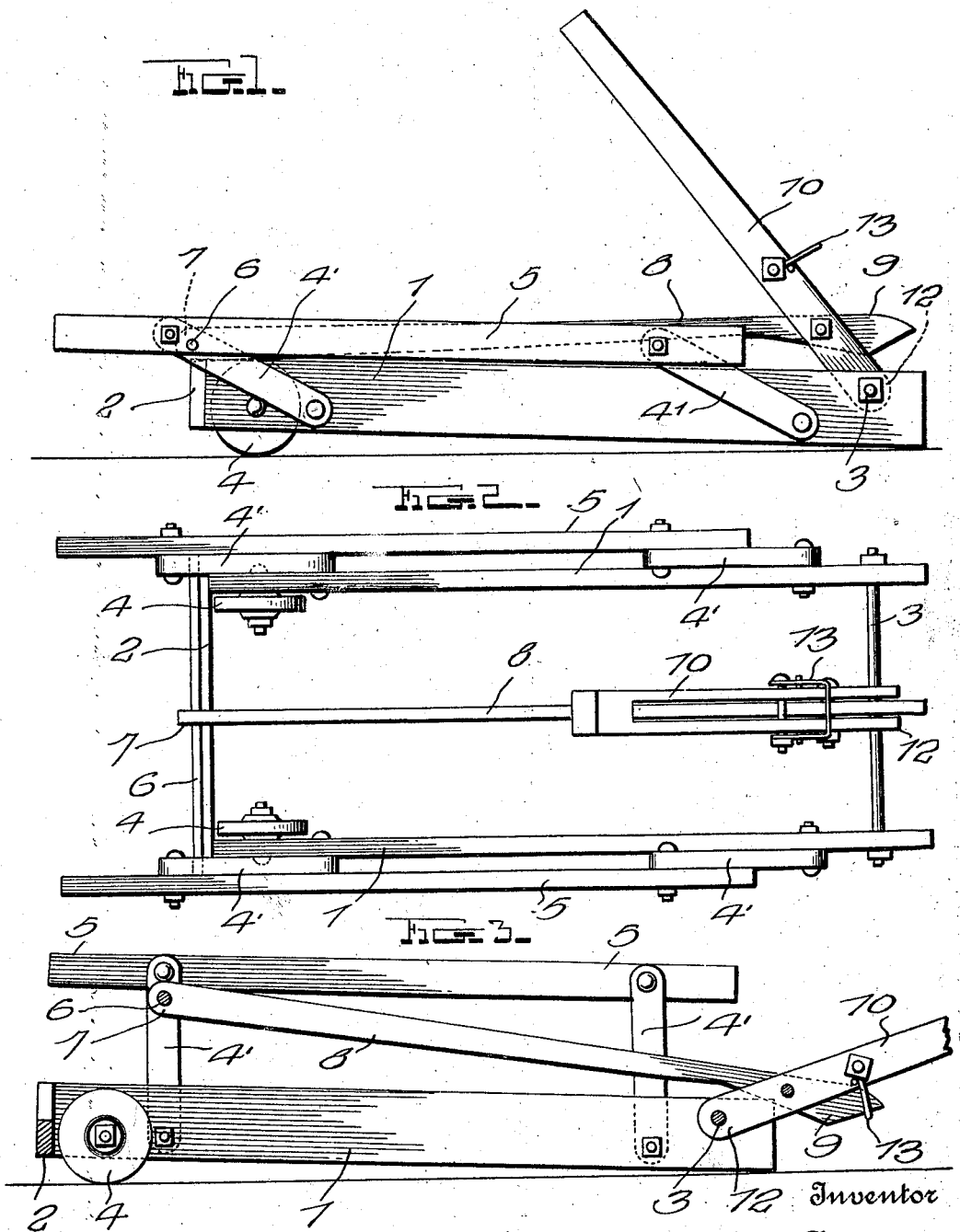

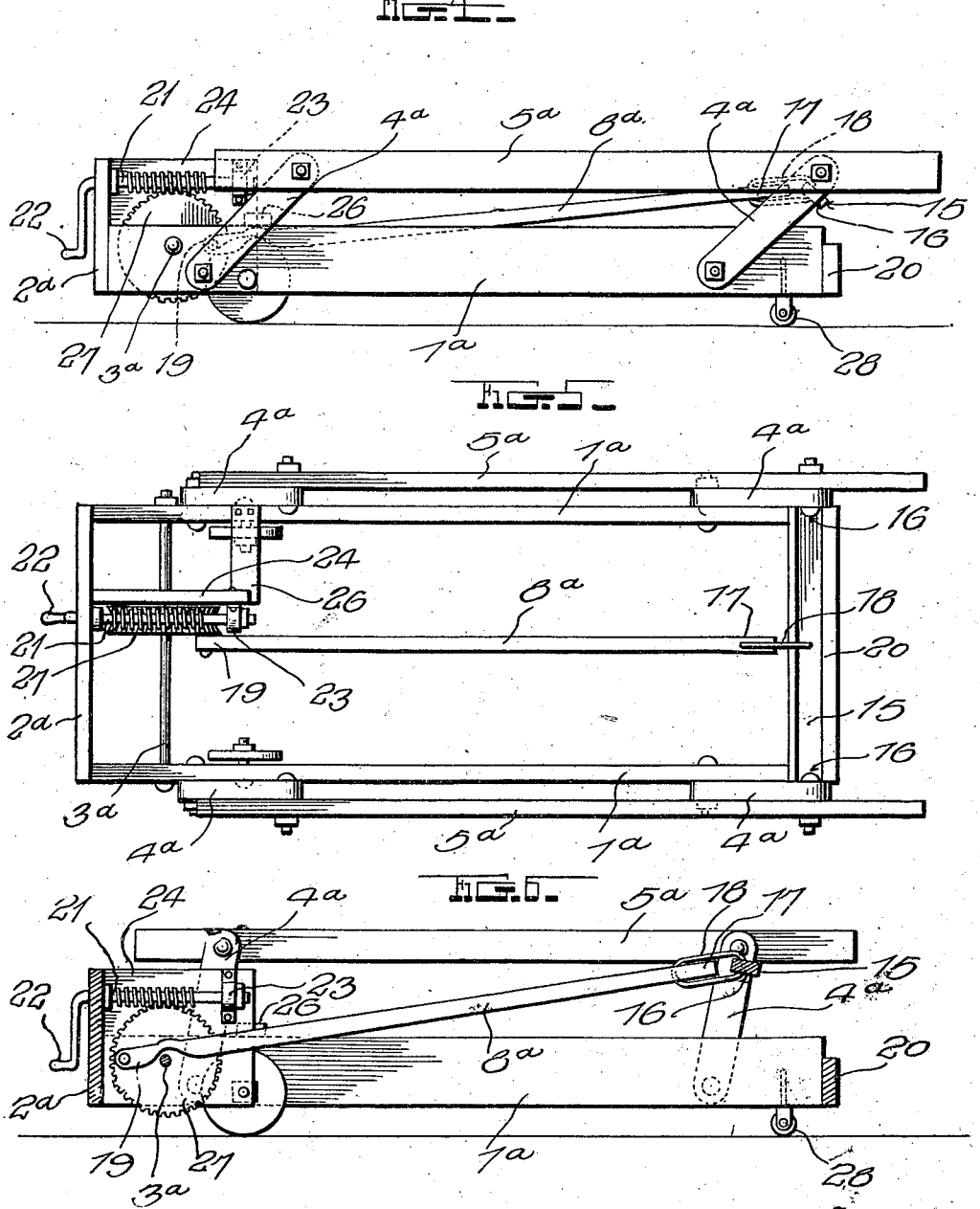

WALLACE R. GRAY, OF BRANDENBERG, KENTUCKY.

VEHICLE-JACK.

1,183,970.   Specification of Letters Patent.   Patented May 23, 1916.

Application filed June 1, 1915. Serial No. 31,542.

*To all whom it may concern:*

Be it known that I, WALLACE R. GRAY, a citizen of the United States, residing at Brandenberg, in the county of Meade and State of Kentucky, have invented certain new and useful Improvements in Vehicle-Jacks; and I do declare the following to be a full, clear, and exact description of the invention, such as will enable others skilled in the art to which it appertains to make and use the same.

This invention relates to vehicle jacks and more particularly to that class of jacks having a supplemental body or platform adapted to be raised or lowered, and has for its object the provision of a device of this character especially adapted for lifting or moving vehicles from place to place.

A further object of this invention is to provide a device which is simple and durable in construction, inexpensive to manufacture, and one which will be very efficient in operation.

With these and numerous other objects in view, my invention consists of the novel features of construction, combination and arrangement of parts which will be herein referred to and more particularly pointed out in the specification and claim.

In the accompanying drawings: Figure 1 is a side elevation of my improved light type of vehicle jack; Fig. 2 is a top plan view of the same; Fig. 3 is a substantially central vertical longitudinal section; Fig. 4 is a side elevation of my heavy type of vehicle jack; Fig. 5 is a top plan view of the same; and Fig. 6 is a substantially central vertical longitudinal section of the same.

In describing my invention, I shall refer to the drawings in which similar reference characters designate corresponding parts throughout the several views.

Referring to the device illustrated in Figs. 1 to 3, my invention consists of a body comprising a rectangular frame consisting of two parallel side bars 1 having their front ends connected by a transversely extending bar 2 and their rear ends by a transversely extending rod 3. Wheels 4 are mounted on the said body near its front end for the purpose of enabling it to be easily moved when desired. Pivoted at their lower ends to the side bars 1 are a pair of swinging uprights 4' on each side board. Pivoted to the upper ends of the uprights are parallel longitudinally extending additional side boards 5 adapted to form a supplemental frame upon which the vehicle will rest. The two swinging uprights at the front end of the frame are connected by a transversely extending rod 6. A longitudinally extending link 8 is loosely connected to the said rod 6 at one end as shown at 7, and has its other end 9 pivoted to a bifurcated lever 10. This lever 10 which is the operating lever of the jack is pivoted at its lower end as shown at 12 to the rod 3 of the body. The end of the link 8 projects through the bifurcated lever and extends a short distance beyond for a purpose to be hereinafter described. Pivoted to the lever and spaced a short distance above where the same is pivoted to the link 8, is a U-shaped locking member 13 which is adapted to lock the link to the lever when the jack is in raised position.

In Figs. 4 to 6 is shown a slightly modified form of my device which consists of a rectangular shaped body comprising side bars $1^a$ with a transversely extending front bar $2^a$ and the rear ends of the side bars connected by a transversely extending plate 20. A pair of swinging uprights $4^a$ are pivoted at their lower ends to each of the side bars $1^a$ and have their upper ends pivoted to additional side bars $5^a$ which are adapted to form the supplemental frame of the jack upon which the vehicle rests. The uprights near the forward end of the body are connected by a transversely extending shaft 15 which has its ends 16 mortised to prevent the said uprights from being forced inward upon a heavy weight being placed upon the supplemental frame.

A longitudinally extending link $8^a$ has one of its ends 17 connected to the transversely extending shaft 15 by an additional link 18 while the other end 19 of the link, is eccentrically mounted on a worm gear 27 which is positioned on a transversely extending bar $3^a$ near the rear end of the body. Projecting through the plate $2^a$ in the rear end of the body, is a screw 21 having a handle 22 on one end and the other end adapted to fit into a bearing 23 which is held by a plate 24 extending longitudinally from the plate $2^a$ between the side bars of the body. This plate 24 is held in the body by a brace 26 extending transversely from one of the side bars to the said plate. The screw 21 has a collar adjacent the inner side of the plate 20 to prevent any inward or outward movement of the said screw. The rectangular shaped body of this device has wheels 28 mounted near its front and rear ends, said wheels mounted near the front end being swiveled so that the device may easily be turned in any desired position.

In operation, when it is desired to lift a vehicle of comparatively light weight, the form of jack first described is best adapted for use. The vehicle is run over the top of this device when the supplemental frame is lowered and spaced but a short distance above the rectangular main frame. The bifurcated lever 10 is then reciprocated longitudinally of the frame and this will draw the transversely extending bar 6 rearwardly by reason of the connecting link between the said bar and the lever. This operation will lift the supplemental frame of the jack and the vehicle to its highest point or to the height of the uprights 4 at which point the lever 10 is in a position nearly in the same plane with the side boards 1 of the body, whereupon the U-shaped locking member 13 will automatically engage the projecting end 9 of the link and lock the parts in position. This will prevent any danger of the jack dropping when in raised position.

If it is desired to lift an automobile or any vehicle of considerable weight, the form last described is preferable. The automobile is driven over the top of the jack and the handle 22 is turned which will operate the screw 21 and the worm gear 27, whereupon the link 8ª being eccentrically mounted on the worm gear 27, will be drawn rearwardly and by reason of its connection to the transversely extending shaft 15, will lift the uprights and the supplemental frame and consequently accomplish the desired purpose.

From the foregoing description of the construction of my improved device, the manner of applying the same to use and the operation thereof will be readily understood and it will be seen that I have provided a simple, inexpensive and efficient means for carrying out the objects of the invention.

While I have particularly described the elements best adapted to perform the functions set forth, it is understood that various changes in form, proportion and in the minor details of construction may be resorted to within the scope of the appended claim without departing from the spirit or sacrificing any of the principles of the invention.

I claim:

In a vehicle jack, a rectangular shaped body, swinging uprights pivoted at their lower ends on opposite sides of said body, and adjacent the ends thereof, parallel longitudinally extending side bars pivoted to the upper ends of the uprights to form a supplemental body, a transversely extending bar connecting two of the uprights at one end of the body, a bifurcated lever pivoted at its lower end to the opposite end of the body, a longitudinally extending link connecting said bar and lever and having one end projecting through the said lever, and a U-shaped locking member pivoted on the lever and adapted to engage the projecting end of the link to lock the jack when in raised position.

In testimony whereof I have hereunto set my hand in presence of two subscribing witnesses.

WALLACE R. GRAY.

Witnesses:
 WILLIAM B. HELT,
 HENRY S. BROWN.